United States Patent
Zuo et al.

(10) Patent No.: US 12,455,872 B2
(45) Date of Patent: Oct. 28, 2025

(54) DATA PROCESSING METHOD AND APPARATUS FOR ACQUISITION OF THE EXECUTION PROGRESS OF THE DDL CHANGE IN EACH DATABASE SUB-LIBRARY LISTED IN THE MASTER TABLE

(71) Applicant: MASHANG CONSUMER FINANCE CO., LTD., Chongqing (CN)

(72) Inventors: Dengpeng Zuo, Chongqing (CN); Haiying Wu, Chongqing (CN); Linchengxi Zeng, Chongqing (CN)

(73) Assignee: MASHANG CONSUMER FINANCE CO., LTD., Chongqing (CN)

( * ) Notice: Subject to any disclaimer, the term of this patent is extended or adjusted under 35 U.S.C. 154(b) by 0 days.

(21) Appl. No.: 18/561,872

(22) PCT Filed: Nov. 14, 2022

(86) PCT No.: PCT/CN2022/131784
§ 371 (c)(1),
(2) Date: Nov. 17, 2023

(87) PCT Pub. No.: WO2023/142610
PCT Pub. Date: Aug. 3, 2023

(65) Prior Publication Data
US 2024/0241879 A1   Jul. 18, 2024

(30) Foreign Application Priority Data
Jan. 28, 2022   (CN) .......................... 202210109020.7

(51) Int. Cl.
*G06F 16/23* (2019.01)

(52) U.S. Cl.
CPC ...... *G06F 16/2365* (2019.01); *G06F 16/2358* (2019.01)

(58) Field of Classification Search
CPC .. G06F 16/2365; G06F 16/2358; G06F 16/27; G06F 16/1815; Y02D 10/00
See application file for complete search history.

(56) References Cited

U.S. PATENT DOCUMENTS

| | | | |
|---|---|---|---|
| 9,171,051 B2 * | 10/2015 | Raghunathan | G06F 16/27 |
| 9,830,223 B1 * | 11/2017 | Holenstein | G06F 11/1474 |

(Continued)

FOREIGN PATENT DOCUMENTS

| | | |
|---|---|---|
| CN | 105447014 A | 3/2016 |
| CN | 107958082 A | 4/2018 |
| CN | 113656384 A | 11/2021 |

OTHER PUBLICATIONS

Dos Santos, Paulo Henrique, Roberto Cesar Betini, and Nádia P. Kozievitch. "An Architecture for Monitoring and Recommending Active Databases DDLs." SBBD. 2015. (Year: 2015).*

(Continued)

*Primary Examiner* — Cheyne D Ly
(74) *Attorney, Agent, or Firm* — Cooper Legal Group, LLC

(57) ABSTRACT

A data processing method. In the method, a target transaction change log of each database sub-library among a plurality of database sub-libraries is acquired and parsed. The target transaction change log is a most recently generated transaction change log in the database sub-library. If an event type indicated by the target transaction change log is a Data Definition Languages (DDL) event, information of the DDL event, which has been recorded in the target transaction change log, is recorded in a target event slot corresponding to the DDL event.

18 Claims, 1 Drawing Sheet

(56) References Cited

U.S. PATENT DOCUMENTS

| | | | | |
|---|---|---|---|---|
| 10,860,612 | B2 | 12/2020 | Lee | |
| 2004/0210606 | A1* | 10/2004 | Brown | G06F 16/284 |
| | | | | 707/999.203 |
| 2004/0225696 | A1* | 11/2004 | Wong | G06F 16/273 |
| | | | | 707/999.203 |
| 2007/0162516 | A1* | 7/2007 | Thiel | G06F 16/273 |
| 2009/0300075 | A1* | 12/2009 | Guan | G06F 16/25 |
| 2018/0225189 | A1* | 8/2018 | Putra | G06F 11/3072 |
| 2018/0246948 | A1* | 8/2018 | Florendo | G06F 16/2455 |

OTHER PUBLICATIONS

International Search Report in the international application No. PCT/CN2022/131784, mailed on Jan. 28, 2023, 2 pages.
Supplementary European Search Report in the European application No. 22923404.2, mailed on Nov. 29, 2024, 16 pages.
First Office Action of the Chinese application No. 202210109020.7, issued on Sep. 6, 2025. 13 pages with English translation.

* cited by examiner

DATA PROCESSING METHOD AND APPARATUS FOR ACQUISITION OF THE EXECUTION PROGRESS OF THE DDL CHANGE IN EACH DATABASE SUB-LIBRARY LISTED IN THE MASTER TABLE

CROSS-REFERENCE TO RELATED APPLICATION

This is a national stage application under 35 U.S.C. 371, based on PCT application No. PCT/CN2022/131784, filed on Nov. 14, 2022, which claims priority to Chinese patent application No. 202210109020.7, filed on Jan. 28, 2022 and entitled "DATA PROCESSING METHOD AND APPARATUS". The disclosures of PCT application No. PCT/CN2022/131784 and Chinese patent application No. 202210109020.7 are hereby incorporated by reference in their entireties.

TECHNICAL FIELD

The disclosure relates to a database sharding technology, and in particular to a data processing method and apparatus.

BACKGROUND

At present, in order to achieve real-time and accurate On-Line Analytical Processing (OLAP) after database sharding, a "middleware synchronization mode" is often used to aggregate a plurality of database sub-libraries into a unified data warehouse HIVE in real time. Specifically, a synchronization middleware uses a pseudo SLAVE protocol to acquire a transaction change log from a database server in real time, then synchronously parses the transaction change log, and converts the transaction change log into a Structured Query Language (SQL) statement for HIVE, so that data in the plurality of database sub-libraries are aggregated to HIVE in real time to meet the requirements for real-time data analysis.

In addition to service Data Manipulation Language (DML) change, each database sub-library listed in a master table of an application also has Data Definition Languages (DDL) change, and one DDL change in the master table of the application usually needs to be executed in all the database sub-libraries of the application. However, the time instants at which the DDL change is executed on the database sub-libraries listed in the master table of the application may not be the same, and the plurality of physically distributed database sub-libraries often fail to execute the DDL change at the same time instant. Therefore, the transaction change logs that record the DDL change information of the respective database sub-libraries of the application may be acquired by the synchronization middleware in a chronological order. As a result, during a certain period of time in which each database sub-library listed in the master table of the application and the HIVE execute a certain DDL change, the structures of tables in the database sub-libraries listed in the master table of the application and in the HIVE may be different, that is, some database sub-libraries may have executed the DDL change, while other database sub-libraries have not executed the DDL change yet.

Therefore, acquisition of the execution progress of the DDL change in each database sub-library listed in the master table of the application in real time and summarization of the execution progresses of the DDL changes in these database sub-libraries are needed.

SUMMARY

The embodiments of the disclosure provide a data processing method, which may include the following operations. A target transaction change log of each database sub-library among a plurality of database sub-libraries is acquired and parsed, the target transaction change log being a most recently generated transaction change log in the database sub-library; and in response to determining that an event type indicated by the target transaction change log is a DDL event, information of the DDL event, which has been recorded in the target transaction change log, is recorded in a target event slot corresponding to the DDL event.

The embodiments of the disclosure further provide a data processing apparatus, which may include: a log acquisition module, configured to acquire and parse a target transaction change log of each database sub-library among a plurality of database sub-libraries, the target transaction change log being a most recently generated transaction change log in the database sub-library; and an event slot recording module, configured to record, in response to determining that an event type indicated by the target transaction change log is a DDL event, information of the DDL event, which has been recorded in the target transaction change log, in a target event slot corresponding to the DDL event.

The embodiments of the disclosure further provide an electronic device. The electronic device includes a processor, a memory, and a computer program stored in the memory and executed by the processor. The computer program is executed by the processor to implement the above data processing method.

The embodiments of the disclosure further provide a non-transitory computer-readable storage medium, in which a computer program is stored. The computer program is executed by a processor to implement the above data processing method.

DETAILED DESCRIPTION

Figure 1:
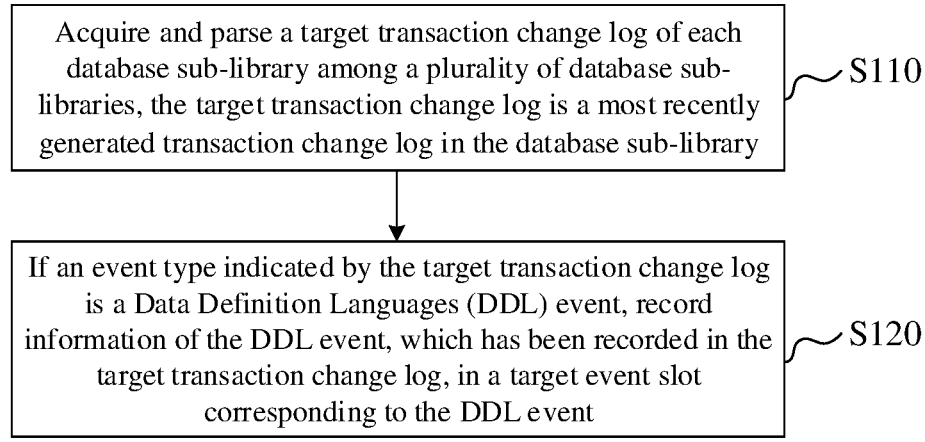
FIG. 1 is a flowchart of a data processing method according to an embodiment of the disclosure.

Some embodiments of the disclosure will be described in detail below in combination with the drawings. The described embodiments are only exemplary and not intended to limit the disclosure.

With the increasing amount of application data stored in a relational database, the amounts of data recorded in the relational databases used by many companies have often reached an upper limit of a recommended value of the amount of data that can be recorded by a single database table. In this case, the application data may be dispersedly stored in the plurality of relational databases of the same type in a horizontal or vertical sharding manner, thereby solving the problems of capacity limitations of a single database, limited number of client connections, performance degradation, and the like caused by storing the data in the single database. Taking the relational database MYSQL as an example, an application may dispersedly store application data thereof into a plurality of MYSQL database sub-libraries through a MYSQL database sub-library proxy middleware or a MYSQL sub-library DDL component, which is also applicable to other relational databases (such as an Oracle database).

When the plurality of MYSQL database sub-libraries of one application execute one DDL change, each of the MYSQL database sub-libraries of the application needs to perform a respective change operation. In this process, the time at which each MYSQL database sub-library executes the DDL change may vary, resulting in a chronological order of DDL change records aggregated into a synchronization middleware of the application. Therefore, the DDL change records aggregated into the application HIVE may also be in a chronological order. As a result, during a certain period of time in which one DDL change is being executed, some MYSQL database sub-libraries may have executed the DDL change, while other MYSQL database sub-libraries may not have executed the DDL change yet. Therefore, acquisition the execution progress of the DDL change in each database sub-library listed in the master table of the application in real time and summarization of the execution progresses of the DDL changes in these database sub-libraries are needed.

In view of this, the embodiments of the disclosure provide a data processing method.

For ease of understanding, the concepts of the database sharding, HIVE, DDL, and DML are described as follows.

Database sharding refers to a method for dispersed storage of data, which mainly uses service characteristics of the data records to dispersedly store the data into the plurality of databases.

HIVE refers to a data warehouse in which HADOOP parallel computing tasks are encapsulated at a bottom layer, and is mainly configured to process structured data on HADOOP. HIVE provides an SQL-like language to achieve data query and converts SQL statements into the parallel computing tasks to run on HADOOP.

DDL mainly refers to definitions of various data objects (libraries, tables, rows, indexes, etc.).

DML mainly refers to addition, deletion, update and query statements of the data records.

As shown in FIG. 1, a data processing method according to the embodiments of the disclosure may include the following operations S110 to S120.

At S110, a target transaction change log of each database sub-library among a plurality of database sub-libraries is acquired and parsed, and the target transaction change log is a most recently generated transaction change log in the database sub-library.

For each database sub-library of one application, a respective target transaction change log (for example, may be expressed as BINLOG_EVENT, or may be referred to as a BINLOG event) is often maintained. That is, each time each database sub-library makes a transaction change to a target application, one target transaction change log is usually generated.

Specifically, the order of magnitude of one master table of one application is often large, so that the master table is jointly maintained by the plurality of database sub-libraries of the application, that is, each database sub-library maintains a respective part of table data of the master table. Each time the table is changed, for example, adding row information, changing row information, and/or deleting row information is made to the master table, the plurality of database sub-libraries often need to perform modifications together. During each modification operation, each database sub-library may record the modification operation in the transaction change log of the database sub-library. That is, during each execution of the transaction change (such as a DDL event), each database sub-library may generate a respective transaction change log.

The transaction change log is configured to record a transaction change record of the database sub-library during the execution of database transaction. Each transaction change log may be composed of an event header and an event body. The event header of the transaction change log may include an event occurrence time, an event type, and an event body length. The event body may include an event content. For example, if the event type is a DDL event, the event body may include a content of the DDL event, that is, newly added row information, modified table information and/or deleted row information.

In practical applications, in order to facilitate the determination of a generation order of the transaction change log, a synchronization site, configured to indicate a serial number of the generated transaction change log in the database sub-library, may also be assigned to the transaction change log. For example, the synchronization site may be set to 1, 2, 3, . . . , n, where n is a positive integer. The transaction change log A with the synchronization site 1 is the first generated transaction change log in the database sub-library a, and the transaction change log B with the synchronization site 2 is the second generated transaction change log in the database sub-library a, that is, the transaction change log B is generated after the transaction change log A, . . . and so on, the later the synchronization site is, the newer the transaction change log is.

For example, when the execution progresses of the DDL event of all the database sub-libraries of the application are summarized, the transaction change log (namely the most recently generated transaction change log) corresponding to the last synchronization site in each database sub-library of the application may be acquired first as the target transaction change log (BINLOG event).

Specifically, the most recently received BINLOG event byte stream of each database sub-library of the application may be read. It should be understood that, during data transmission, the most basic unit for data transmission is a byte stream. In the embodiment of the disclosure, the data transmission between the database sub-library and the synchronization middleware is often in a binary form, the BINLOG event may specifically be represented as a string of binary characters, which, during transmission, may be referred to as a byte stream.

As an example, the first 23 bytes of the BINLOG event byte stream may be read as a BINLOG event header for parsing, so as to obtain values such as the event occurrence time, the event type, and the event body length from the BINLOG event header, and then the number of bytes represented by the event body length is read from the 24th byte of the BINLOG event byte stream as a BINLOG event body, so as to obtain a complete BINLOG event, including the BINLOG event header and the BINLOG event body.

The event type in the BINLOG event header may include the DDL event and a DML event. As an example, the event type corresponding to the DDL event may be expressed as "QUERY_EVENT". The event type corresponding to the DML event may be expressed as "WRITE_ROWS_EVENT", "UPDATE_ROWS_EVENT", and/or "DELETE_ROWS_EVENT".

For example, if the acquired event type in the BINLOG event header is "QUERY_EVENT", the method may enter a branch flow of executing the DDL event. If the acquired event type in the BINLOG event header is "WRITE_ROWS_EVENT", "UPDATE_ROWS_EVENT", and/or "DELETE_ROWS_EVENT", the method may enter a branch flow of executing the DML event.

At S120, if the event type indicated by the target transaction change log is the DDL event, information of the DDL event, which has been recorded in the target transaction change log, is recorded in a target event slot corresponding to the DDL event.

Specifically, if the event type indicated in the event header of the target transaction change log obtained by parsing is "QUERY_EVENT", it indicates that the event type indicated by the target transaction change log is the DDL event. At this time, the method may enter the branch flow of executing the DDL event.

In one implementation, in order to save the storage space of the target event slot and quickly determine whether a certain DDL event has been recorded in the target event slot, in the embodiment of the disclosure, a summary of a change content of the DDL event in the target transaction change log may be acquired, and the summary of the change content of the DDL event, rather than the change content of the DDL event, is recorded in the target event slot. For example, the summary of the change content of the DDL event may be calculated by using a hash algorithm based on the change content of the DDL event.

In this way, on the premise that the summary of the change content of the DDL event has been recorded in the target event slot, when recording an execution state of other database sub-libraries regarding the DDL event in the target event slot, a timestamp of the execution of the DDL event may be directly recorded under the summary of the change content of the DDL event.

Specifically, the target transaction change log may include a table name of the DDL event, and the information of the DDL event may include the summary of the change content of the DDL event, a database sub-library identifier associated with the DDL event, and a timestamp of the execution of the DDL event by the database sub-library corresponding to the database sub-library identifier associated with the DDL event. In this case, a target event slot corresponding to a table name of the DDL event in the target transaction change log may be determined first, and then the summary of the change content of the DDL event, the timestamp of the DDL event and/or the database sub-library identifier associated with the DDL event in the target transaction change log are recorded in the determined target event slot.

Here, one master table is jointly maintained by the plurality of database sub-libraries, and one master table corresponds to one event slot, that is, the table name of each master table may correspond to a respective event slot.

When the target event slot is not empty, a DDL event time array may be maintained in the target event slot, and the DDL event time array contains the timestamps of the executions of the DDL event by all the database sub-libraries. It should be understood that, in order to distinguish the timestamps of the executions of the DDL event by the different database sub-libraries, the DDL event time array may further include respective sub-library identifiers of the database sub-libraries (such as respective sub-library numbers of the database sub-libraries).

As an example, the summary of the change content of the DDL event and the DDL event time array may be recorded in the target event slot. The DDL event time array may be expressed as [a1, a2, a3, ..., an], where location identifiers 1-n of a1-an may correspond to the sub-library identifiers of the database sub-libraries respectively, and the specific values of a1-an may be the timestamps of the executions of the DDL event by the database sub-libraries.

In one implementation, since one master table of the application usually corresponds to one target event slot, in order to simplify the information recorded in the target event slot and simplify the difficulty in extracting the information from the target event slot, in the embodiment of the disclosure, the target event slot may be set to one of two states, namely an empty state and a non-empty state. When the target event slot is empty, it indicates that all the database sub-libraries have completed executions of the last DDL event of the master table corresponding to the target event slot, and the next DDL event has not yet begun to execute in each database sub-library of the application.

When the target event slot is not empty, it indicates that not all the database sub-libraries have completed executions of the last DDL event of the master table corresponding to the target event slot, that is, some of the database sub-libraries have completed the execution(s) of the DDL event, while other of the database sub-libraries have not completed the execution(s).

If it is determined that the target event slot is empty, the summary of the change content of the DDL event, the timestamp of the DDL event, and the database sub-library identifier associated with the DDL event in the target transaction change log may be recorded in the target event slot corresponding to the table name of the DDL event in the target transaction change log.

If it is determined that the target event slot is not empty, the timestamp of the DDL event and the database sub-library identifier associated with the DDL event in the target transaction change log may be recorded in the target event slot corresponding to the table name of the DDL event in the target transaction change log.

When the target event slot is empty, one empty DDL event time array may be created first, and a location identifier of each element in the empty DDL event time array may correspond to a respective one of the database sub-library identifiers. Then, a timestamp of the DDL event for each database sub-library may be recorded at a corresponding element location in the DDL event time array in the target event slot corresponding to the table name of the DDL event according to the corresponding database sub-library identifier. The summary of the change content of the DDL event may also be recorded in the target event slot.

When the target event slot is not empty, the timestamp of the DDL event for each database sub-library may be directly recorded at the corresponding element location in the DDL event time array in the target event slot corresponding to the table name of the DDL event according to the corresponding database sub-library identifier.

In one implementation, the target event slot only records the execution progress of the DDL event in each database sub-library of the application once at a time. After the timestamps of the executions of the DDL event in all the database sub-libraries of the application are recorded, clearing processing is performed. Therefore, in order to facilitate the determination of a DDL change track of the master table of the application, in the embodiment of the disclosure, each time the DDL event is synchronized to the data warehouse corresponding to the application, records of the change content of the DDL event executed by the database sub-libraries of the application may also be recorded in the synchronization middleware.

Specifically, the target transaction change log may further include the change content of the DDL event. In this case, the above data processing method may further include operations of synchronizing the change content of the DDL event to the data warehouse corresponding to the application, the DDL event corresponding to the application, and acquiring and recording records of the change content of the DDL event executed by the database sub-libraries corresponding to the application.

For example, two types of data meta information, namely meta-${DB}-${tab} and meta-DDL-hive-${tab}, may be recorded in the synchronization middleware.

The meta-${DB}-${tab} is configured to record table meta information of each database sub-library of the application, and mainly store metadata information of each database sub-library after each execution of the DDL event, which mainly contains information such as the timestamp of the execution of the DDL event, a changed row name, a changed row type, and an initial value. As an example, the information recorded in the meta-${DB}-${tab} may be arranged in a reverse order of the timestamps of the executions of the DDL event.

The meta-DDL-HIVE-${tab} is configured to record a change history of the executions of the DDL event in the HIVE data warehouse and information about the executions of the DDL event by all the database sub-libraries of the application summarized by the target event slot, which mainly contains the information such as the timestamp of the execution of the DDL event, the change content of the DDL event, the summary of the change content of the DDL event, the DDL event time array, the newly added row information, the modified table information, and the deleted row information. As an example, the information recorded in the meta-DDL-HIVE-${tab} may be arranged in a reverse order of the timestamps of the executions of the DDL event.

Figure 2:
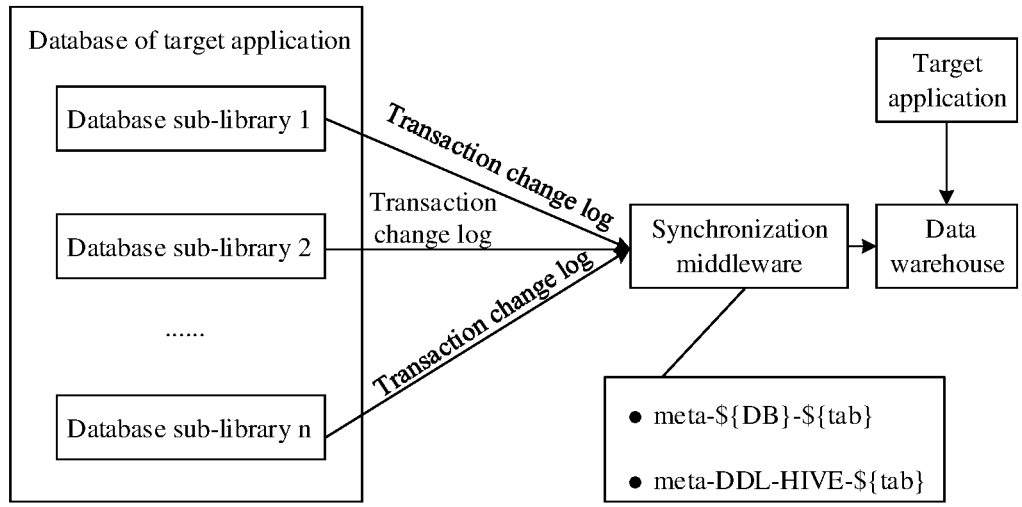
FIG. 2 is a schematic diagram of an actual scenario in which a data processing method according to an embodiment of the disclosure may be applied.

The branch flow of executing the DDL event will be described in detail below in combination with a schematic diagram of an actual scenario in which the data processing method may be applied shown in FIG. 2. Here, any one of the plurality of applications maintained in the database is described as the target application for description, and the branch flow of executing the DDL event may include the following steps.

The synchronization middleware sequentially parses, from each of the target transaction change logs most recently sent by respective database sub-libraries (the database sub-library 1, the database sub-library 2, . . . , the database sub-library n) of the target application, a respective database sub-library number, the table name and the DDL statement of the DDL event. The target transaction change logs most recently sent by the database sub-library 1, the database sub-library 2, . . . , the database sub-library n of the target application are the target transaction change log 1, the target transaction change log 2, . . . , the target transaction change log n, respectively. The synchronization middleware stores the table meta information, which is changed after each database sub-library of the target application executes the DDL event, in the meta-${DB}-${tab} of each database sub-library of the target application, where the timestamps of the executions of the DDL event by the database sub-library 1, the database sub-library 2, . . . , the database sub-library n, and a table row name and a row type in the change content in the executions of the DDL event are mainly written.

The synchronization middleware obtains the summary of the change content of the DDL event based on the change content of the DDL event, and then searches for the target event slot corresponding to the table name according to the table name corresponding to the change content of the DDL event.

If it is determined that the target event slot is empty, a receiving time of the target transaction change log, the summary of the change content of the DDL event, and the timestamp of the execution of the DDL event are written in the target event slot, and then the information recorded in the target event slot is written in the meta-DDL-HIVE-${tab} recorded by the synchronization middleware, where the timestamp of the execution of the DDL event, the summary of the change content of the DDL event, the DDL statement, the newly added row information, the modified table information and/or the deleted row information are mainly written. In addition, the information written in the target event slot is sent to the HIVE data warehouse corresponding to the target application, so that the HIVE data warehouse executes the corresponding DDL event.

If it is determined that the target event slot is not empty, only the currently received timestamp of the execution of the DDL event by the database sub-library is added to the DDL event time array of the target event slot, and the information recorded in the target event slot is updated to the meta-DDL-HIVE-${tab} recorded by the synchronization middleware.

When the information of the DDL event in all the database sub-libraries is recorded in the target event slot, all the information recorded in the target event slot is stored to the meta-DDL-HIVE-${tab} recorded by the synchronization middleware, and the target event slot is restored to an empty state.

In one implementation, in order to aggregate all the information of the DDL event recorded in the target event slot, after all the database sub-libraries of the master table of the same application have executed the same DDL event, the information about the execution of the DDL event by all the database sub-libraries of the master table of the same application is recorded in the corresponding target event slot, so that the information of the DDL event with the same table name is recorded in the corresponding target event slot, and then all the information of the DDL event in the target event slot may be synchronized to the synchronization middleware of the target application corresponding to the DDL event.

As an example, after the information of the DDL event in all the database sub-libraries corresponding to the target table name is recorded in the target event slot, all the information of the DDL event in the target event slot corresponding to the target table name is updated to the meta-DDL-HIVE-${tab} of the synchronization middleware of the target application.

Specifically, each time after the content of the DDL event executed by one database sub-library is recorded, the content of the DDL event executed by the database sub-library may be recorded in the meta-${DB}-${tab}; then according to the summary of the change content of the DDL event, the timestamp of the execution of the DDL event, and the database sub-library identifier, the content of the DDL event executed by the database sub-library is written into the target event slot; then, the DDL event which has been written into the target event slot is executed in the HIVE data warehouse, and after the execution is successful, changes in the execution of the DDL event in the HIVE data warehouse are recorded in the meta-DDL-HIVE-${tab}; and finally, after all the information of the DDL event with the same table name in the database sub-libraries is recorded in the target event slot, the information of the DDL event recorded in the target event slot is updated to the meta-DDL-HIVE-${tab} of the synchronization middleware of the target application.

In one implementation, in order to facilitate the recording of the execution progress of executing the next DDL event by each database sub-library of the target application, and save the storage space of the target event slot, in a case where the content of the DDL event executed by all the database sub-libraries has been recorded in the target event slot, after all the information of the DDL event in the target event slot is synchronized to the synchronization middleware of the target application, the target event slot may be cleared.

In addition, if the event type indicated in the event header of the target transaction change log is any one of "WRITE_ROWS_EVENT", "UPDATE_ROWS_EVENT", and "DELETE_ROWS_EVENT", the method may enter the branch process of executing the DML event.

Specifically, the data processing method according to the embodiments of the disclosure may further include the following steps.

If the event type indicated by the target transaction change log is the DML event, information of a target DDL event is acquired from the synchronization middleware of the application, where the information of the target DDL event is information of the most recently generated DDL event in the synchronization middleware.

A first DDL event corresponding to the information of the target DDL event is determined.

A timestamp sequence of the first DDL event generated by the database sub-library(ies) executing the first DDL event in the plurality of database sub-libraries is determined according to the first DDL event.

DML statement(s) is/are adjusted sequentially according to the information of the first DDL event corresponding to the timestamp sequence.

In practical applications, in order to acquire the information of the target DDL event from the synchronization middleware of the target application, the event occurrence time in the event header of the target transaction change log may be extracted as an "event timestamp A", and the DML statement in the event body of the target transaction change log may be parsed to obtain the database sub-library identifier and the table name a. Then, the table meta information is searched in the meta-${DB}-${tab} of the synchronization middleware, where a query condition may be, for example, "meta-${DB}-${tab}". timestamp<event timestamp A", and then a query result is filtered to extract a record with a maximum DDL event timestamp. Each row of the metadata information of the table at the corresponding time instant is obtained after filtering, and the maximum timestamp of the DDL event may be assigned to the DDL event timestamp B. Then, a DDL change track array corresponding to the table name a is searched in the meta-DDL-HIVE-${tab} of the synchronization middleware, where a query condition may be, for example, "meta-hive-${tab}. sub-library DDL event time=0 or meta-hive-${tab}. sub-library DDL event time>=DDL event timestamp B", that is, it is queried whether there is a DDL event that occurs after the DDL event timestamp B. If not, the DDL event corresponding to the DDL event timestamp B is taken as the first DDL event. If yes, the DDL event that occurs after the event timestamp B is taken as the first DDL event. At this time, the information of the most recently generated target DDL event can be acquired. Here, the first DDL event may include at least one of adding a specified row of the table, deleting a specified row of the table, or changing a specified row of the table.

It should be understood that, the database sub-libraries of the target application execute the DDL event in a certain chronological order, and in order to maintain the consistency of the table changes corresponding to the DDL event, the DML statement(s) should also be adjusted sequentially according to the order of the timestamp(s) of the execution(s) of the DDL event. Therefore, it also needs to determine the timestamp sequence of the first DDL event generated by the database sub-library(ies) executing the first DDL event in the plurality of database sub-libraries, and sequentially adjust the DML statement(s) according to the information of the first DDL event corresponding to the timestamp sequence. As an example, the information of the first DDL event corresponding to the timestamp sequence may be sorted according to the chronological order of the timestamp sequence, and the DML statement(s) may be adjusted sequentially based on the sorted information of the first DDL event.

After the DML statement(s) is/are adjusted sequentially, the adjusted DML statement(s) is/are executed in the HIVE data warehouse. It is apparent that, in this way, during the execution(s), the DML statement(s), which is/are adjusted sequentially according to the order of the timestamp(s) of the execution(s) of the DDL event, may be automatically executed in sequence, without the need for maintenance personnel to be involved in maintaining the execution order.

An example of the branch flow of executing the DML event will be described in detail below, and the example may include the following steps.

First, an event timestamp A of the DML event is extracted from the event header of the target transaction change log, and the event body of the target transaction change log is parsed to obtain the database sub-library identifier and the table name.

Then, the table meta information is searched in the meta-${DB}-${tab} of each database sub-library recorded by the synchronization middleware, where a query condition is "meta-${DB}-${tab}". timestamp<event timestamp A", and then a query result is filtered to extract a record with a maximum DDL event timestamp. Each row of the metadata information of the table at the corresponding time instant is obtained after filtering, and the maximum DDL event timestamp may be assigned to the DDL event timestamp B.

Then, a DDL change track array of the DDL event corresponding to the obtained table name is searched in the meta-DDL-HIVE-${tab} recorded by the synchronization middleware, where a query condition is "meta-hive-${tab}. sub-library DDL event time=0 or meta-hive-${tab}. sub-library DDL event time>=DDL event timestamp B", that is, it is queried whether the DDL event occurs after the maximum DDL event timestamp B. If no DDL event occurs after the maximum DDL event timestamp, the DDL event corresponding to the DDL event timestamp B is taken as a previous DDL event of the DML event. If the DDL event occurs after the maximum DDL event timestamp B, the DDL event that occurs after the event timestamp B is taken as the previous DDL event of the DML event.

Then, the change records of the previous DDL event are taken out from the change track array of the DDL event in a reverse order, and each field of the DML statement is re-adjusted accordingly. For example, if there is an indication of adding a row in the change record, the corresponding new row is added to the DML; if there is an indication of deleting a row in the change record, the corresponding row is deleted from the DML; and if there is an indication of changing a row in the change record, the corresponding row is changed in the DML.

After the DML is adjusted sequentially, the adjusted DML statement is executed correctly in HIVE.

According to the embodiment of the disclosure, each time each database sub-library of the target application generates a new transaction change log with a DDL event recorded, the content of the DDL event, which has been recorded in the transaction change log, is recorded in the target event slot corresponding to the DDL event. The progress of processing the same DDL event of each database sub-library may be intuitively acquired from the target event slot, that is, the database sub-library(ies) corresponding to the content of the DDL event, which has been recorded in the target event slot, has completed the change of the DDL event, and the database sub-library(ies), which does/do not record the relevant information in the target event slot, has/have not completed the change of the corresponding DDL event. In this way, the progress information about the execution of the DDL event by each database sub-library may be monitored in real time during the one DDL event change.

Figure 3:
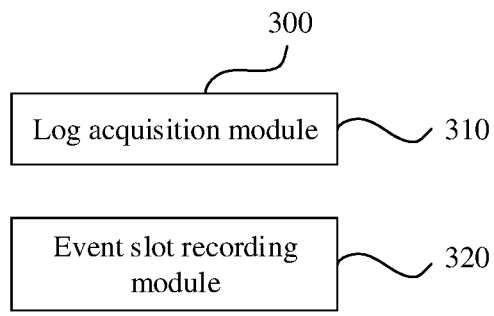
FIG. 3 is a block diagram of a data processing apparatus according to an embodiment of the disclosure.

In addition, corresponding to the above data processing method, the embodiments of the disclosure further provide a data processing apparatus. As shown in FIG. 3, the data processing apparatus 300 may include a log acquisition module 310 and an event slot recording module 320.

The log acquisition module 310 may acquire and parse a target transaction change log of each database sub-library among a plurality of database sub-libraries, and the target transaction change log is the most recently generated transaction change log in the database sub-library.

The event slot recording module 320 may record, in response to determining that an event type indicated by the target transaction change log is a DDL event, information of the DDL event, which has been recorded in the target transaction change log, in a target event slot corresponding to the DDL event.

In one implementation, the target transaction change log includes a table name of the DDL event, and the information of the DDL event includes a summary of a change content of the DDL event, a database sub-library identifier of the DDL event, and a timestamp of the execution of the DDL event by the database sub-library corresponding to the database sub-library identifier of the DDL event. In this case, the event slot recording module 320 may first determine the target event slot corresponding to the table name of the DDL event in the target transaction change log, and then record the summary of the change content of the DDL event, the timestamp of the DDL event and/or the database sub-library identifier of the DDL event in the target transaction change log in the determined target event slot.

In one implementation, the event slot recording module 320 may first determine whether the target event slot is empty. If determining that the target event slot is empty, the event slot recording module 320 may record the summary of the change content of the DDL event, the timestamp of the DDL event, and the database sub-library identifier of the DDL event in the target transaction change log, in the target event slot corresponding to the table name of the DDL event. If determining that the target event slot is not empty, the event slot recording module 320 may record the timestamp of the DDL event and the database sub-library identifier of the DDL event, in the target event slot corresponding to the table name of the DDL event.

In one implementation, the target transaction change log further includes the change content of the DDL event. In this case, the data processing apparatus 300 may further include: a first synchronization module, configured to synchronize the change content of the DDL event to a data warehouse corresponding to an application, the DDL event corresponding to the application; and a second recording module, configured to acquire and record records of the change content of the DDL event executed by the database sub-libraries corresponding to the application.

In one implementation, the data processing apparatus 300 may further include a second synchronization module, configured to synchronize, in a case where all the information of the DDL event with the same table name has been recorded in the corresponding target event slot, all the information of the DDL event in the corresponding target event slot to a synchronization middleware of the application corresponding to the DDL event.

In one implementation, the data processing apparatus 300 may further include a clearing module, configured to clear the target event slot after the second synchronization module synchronizes all the information of the DDL event in the target event slot to the synchronization middleware.

In one implementation, the data processing apparatus 300 may further include a second acquisition module, an event determination module, a sequence determination module, and a statement adjustment module.

The second acquisition module may be configured to acquire, in response to determining that the event type indicated by the target transaction change log is a DML event, information of a target DDL event from the synchronization middleware of the application, where the information of the target DDL event is information of the most recently generated DDL event in the synchronization middleware.

The event determination module may determine a first DDL event corresponding to the information of the target DDL event.

The sequence determination module may determine, according to the first DDL event, a timestamp sequence of the first DDL event generated by the database sub-library (ies) executing the first DDL event in the plurality of database sub-libraries.

The statement adjustment module may sequentially adjust DML statement(s) according to the information of the first DDL event corresponding to the timestamp sequence.

The above modules in the apparatus provided by the embodiment of the disclosure may also implement the method steps provided by the method embodiment. Alternatively, the apparatus provided by the embodiment of the disclosure may further include modules other than the above modules for implementing the method steps provided by the method embodiment. The apparatus provided by the embodiment of the disclosure can achieve the technical effects that can be achieved by the above method embodiment.

The embodiments of the disclosure further provide an electronic device. The electronic device may include a processor, a memory, and a computer program stored in the memory and executed by the processor. The computer program is executed by the processor to implement each process of the above data processing method embodiment, and achieve the same technical effect.

The embodiments of the disclosure further provide a computer-readable storage medium. A computer program is stored in the computer-readable storage medium, and the computer program is executed by a processor to implement each process of the above data processing method embodiment, and achieve the same technical effect. The computer-readable storage medium may include, for example, a Read-Only Memory (ROM), a Random Access Memory (RAM), a magnetic disk, a compact disc, etc.

Those skilled in the art should understand that the embodiments of the disclosure may be provided as methods, systems, or computer program products. Therefore, the disclosure may take the form of an entirely hardware embodiment, an entirely software embodiment, or an embodiment combining software and hardware aspects. Furthermore, the disclosure may take the form of a computer program product implemented on one or more computer available storage media (including, but not limited to, a disk storage, a Compact Disc-ROM (CD-ROM), an optical memory, etc.) having a computer available program code embodied thereon.

The disclosure is described with reference to flowcharts and/or block diagrams of the method, the device (system) and the computer program product according to the embodiments of the disclosure. It should be understood that each flow and/or block in the flowcharts and/or the block diagrams and a combination of the flows and/or the blocks in the flowcharts and/or the block diagrams may be implemented by computer program instructions. These computer program instructions may be provided for a general-purpose computer, a dedicated computer, an embedded processor or processors of other programmable data processing devices to generate a machine, so that an apparatus for achieving functions designated in one or more flows of the flowcharts and/or one or more blocks of the block diagrams is generated via instructions executed by the computers or the processors of the other programmable data processing devices.

These computer program instructions may also be stored in a computer-readable memory capable of guiding the computers or the other programmable data processing devices to work in a specific mode, so that a manufactured product including an instruction apparatus is generated via the instructions stored in the computer-readable memory, and the instruction apparatus achieves the functions designated in one or more flows of the flowcharts and/or one or more blocks of the block diagrams.

These computer program instructions may also be loaded to the computers or the other programmable data processing devices, so that processing implemented by the computers is generated by executing a series of operation steps on the computers or the other programmable devices, and therefore the instructions executed on the computers or the other programmable devices provide a step of achieving the functions designated in one or more flows of the flowcharts and/or one or more blocks of the block diagrams.

In a typical configuration, a computing device includes one or more processors (Central Processing Unit (CPU)), an input/output interface, a network interface, and a memory.

The memory may include a volatile memory, an RAM and/or a non-volatile memory in a computer-readable medium, such as an ROM or a flash memory (flash RAM). The memory is an example of the computer-readable medium.

The computer-readable medium includes volatile and non-volatile, removable and non-removable media implemented in any method or technology for storage of information. The information may be computer-readable instructions, data structures, program modules, or other data. Examples of the computer storage media include, but are not limited to, a Phase-Change RAM (PRAM), a Static RAM (SRAM), a Dynamic RAM (DRAM), other types of RAM, ROM, Electrically Erasable Programmable ROM (EEPROM), flash memory or other memory technologies, CD-ROM, Digital Video Disks (DVDs) or other optical storage, magnetic cassette tapes, tape disk storage or other magnetic storage devices, or any other non-transmission medium which can be used to store the information that can be accessed by the computing device. As defined herein, the computer-readable medium does not include transitory media, such as modulated data signals and carriers.

It is to be noted that, terms "include" and "contain" or any other variant thereof is intended to cover nonexclusive inclusions herein, so that a process, method, commodity or device including a series of elements not only includes those elements but also includes other elements which are not clearly listed or further includes elements intrinsic to the process, the method, the commodity or the device. Under the condition of no more limitations, an element defined by the statement "including a/an . . . " does not exclude existence of the same other elements in a process, method, commodity or device including the element.

Those skilled in the art should understand that the embodiments of the disclosure may be provided as methods, systems, or computer program products. Therefore, the disclosure may take the form of an entirely hardware embodiment, an entirely software embodiment, or an embodiment combining software and hardware aspects. Furthermore, the disclosure may take the form of a computer program product implemented on one or more computer available storage media (including, but not limited to, a disk storage, a CD-ROM, an optical memory, etc.) having a computer available program code embodied thereon.

The embodiments of the disclosure described above are not intended to limit the disclosure. For those skilled in the art, various modifications and changes can be made to the disclosure. Any modifications, equivalent substitutions, improvements, etc. within the spirit and principle of the disclosure shall be included in the scope of the claims of the disclosure.

The invention claimed is:

1. A data processing method, performed by a processor, and the method comprising:
  acquiring and parsing a target transaction change log of each database sub-library among a plurality of database sub-libraries listed in a master table of an application, the target transaction change log being a most recently generated transaction change log in the database sub-library;
  in response to determining that an event type indicated by the target transaction change log is a Data Definition Languages (DDL) event, recording information of the DDL event, which has been recorded in the target transaction change log, in a target event slot corresponding to the DDL event, so as to monitor progress information about execution of the DDL event by each database sub-library among the plurality of database sub-libraries listed in the master table of the application; and
  in response to determining that all the information of the DDL event with a same table name is recorded in the target event slot, synchronizing all the information of the DDL event in the target event slot to a synchronization middleware of the application corresponding to the DDL event.

2. The method of claim 1, wherein the target transaction change log comprises the table name of the DDL event, and the information of the DDL event comprises a summary of a change content of the DDL event, a database sub-library identifier of the DDL event, and a timestamp of execution of the DDL event by the database sub-library corresponding to the database sub-library identifier of the DDL event;

the recording information of the DDL event, which has been recorded in the target transaction change log, in a target event slot corresponding to the DDL event comprises:
- determining the target event slot corresponding to the table name of the DDL event; and
- recording at least one of the summary of the change content of the DDL event, the timestamp, or the database sub-library identifier of the DDL event in the determined target event slot.

3. The method of claim 2, wherein the recording at least one of the summary of the change content of the DDL event, the timestamp, or the database sub-library identifier of the DDL event in the determined target event slot comprises:
- in response to determining that the target event slot is empty, recording the summary of the change content of the DDL event, the timestamp, and the database sub-library identifier of the DDL event in the determined target event slot; and
- in response to determining that the target event slot is not empty, recording the timestamp and the database sub-library identifier of the DDL event in the determined target event slot.

4. The method of claim 3, wherein the recording the summary of the change content of the DDL event, the timestamp, and the database sub-library identifier of the DDL event in the determined target event slot comprises:
- recording the summary of the change content of the DDL event in the target event slot;
- creating a DDL event time array in the target event slot, wherein each of a plurality of element location identifiers in the DDL event time array corresponds to the database sub-library identifier of a respective one of the plurality of database sub-libraries; and
- recording the timestamp at a location, which is indicated by one of the plurality of element location identifiers corresponding to the database sub-library identifier of the DDL event, in the DDL event time array.

5. The method of claim 1, wherein the target transaction change log comprises change content of the DDL event; and wherein the method further comprises:
- synchronizing the change content of the DDL event to a data warehouse corresponding to the application, the DDL event corresponding to the application; and
- acquiring and recording records of the change content of the DDL event executed by the plurality of database sub-libraries corresponding to the application.

6. The method of claim 1, further comprising:
clearing the target event slot after all the information of the DDL event in the target event slot is synchronized to the synchronization middleware.

7. The method of claim 1, further comprising:
in response to determining that the event type indicated by the target transaction change log is a Data Manipulation Language (DML) event, acquiring information of a target DDL event from the synchronization middleware of the application, the information of the target DDL event being information of a most recently generated DDL event in the synchronization middleware;
determining a first DDL event corresponding to the information of the target DDL event;
determining, according to the first DDL event, a timestamp sequence of the first DDL event generated by at least one database sub-library executing the first DDL event in the plurality of database sub-libraries; and
adjusting, according to information of the first DDL event corresponding to the timestamp sequence, at least one DML statement sequentially.

8. The method of claim 7, wherein the adjusting, according to information of the first DDL event corresponding to the timestamp sequence, at least one DML statement sequentially comprises:
- sorting the information of the first DDL event corresponding to the timestamp sequence according to a chronological order of the timestamp sequence; and
- adjusting the at least one DML statement sequentially based on the sorted information of the first DDL event.

9. An electronic device, comprising: a memory, a processor, and a computer program stored in the memory and executable by the processor, wherein the processor, when executing the computer program, is configured to:
- acquire and parse a target transaction change log of each database sub-library among a plurality of database sub-libraries listed in a master table of an application, the target transaction change log being a most recently generated transaction change log in the database sub-library;
- record, in response to determining that an event type indicated by the target transaction change log is a Data Definition Languages (DDL) event, information of the DDL event, which has been recorded in the target transaction change log, in a target event slot corresponding to the DDL event, so as to monitor progress information about execution of the DDL event by each database sub-library among the plurality of database sub-libraries listed in the master table of the application; and
- in response to determining that all the information of the DDL event with a same table name is recorded in the target event slot, synchronize all the information of the DDL event in the target event slot to a synchronization middleware of the application corresponding to the DDL event.

10. The electronic device of claim 9, wherein the target transaction change log comprises the table name of the DDL event, and the information of the DDL event comprises a summary of a change content of the DDL event, a database sub-library identifier of the DDL event, and a timestamp of execution of the DDL event by the database sub-library corresponding to the database sub-library identifier of the DDL event;
the processor is configured to:
- determine the target event slot corresponding to the table name of the DDL event; and
- record at least one of the summary of the change content of the DDL event, the timestamp, or the database sub-library identifier of the DDL event in the determined target event slot.

11. The electronic device of claim 10, wherein the processor is configured to:
- record, in response to determining that the target event slot is empty, the summary of the change content of the DDL event, the timestamp, and the database sub-library identifier of the DDL event in the determined target event slot; and
- record, in response to determining that the target event slot is not empty, the timestamp and the database sub-library identifier of the DDL event in the determined target event slot.

12. The electronic device of claim 11, wherein the processor is configured to: in response to determining that the target event slot is empty, record the summary of the change content of the DDL event in the target event slot;

create a DDL event time array in the target event slot, wherein each of a plurality of element location identifiers in the DDL event time array corresponds to the database sub-library identifier of a respective one of the plurality of database sub-libraries; and record the timestamp at a location, which is indicated by one of the plurality of element location identifiers corresponding to the database sub-library identifier of the DDL event, in the DDL event time array.

13. The electronic device of claim 9, wherein the target transaction change log comprises change content of the DDL event; and wherein the processor is further configured to:
synchronize the change content of the DDL event to a data warehouse corresponding to the application, the DDL event corresponding to the application; and
acquire and record records of the change content of the DDL event executed by the plurality of database sub-libraries corresponding to the application.

14. The electronic device of claim 9, wherein the processor is further configured to:
clear the target event slot after the processor synchronizes all the information of the DDL event in the target event slot to the synchronization middleware.

15. The electronic device of claim 9, wherein the processor is further configured to:
acquire, in response to determining that the event type indicated by the target transaction change log is a Data Manipulation Language (DML) event, information of a target DDL event from the synchronization middleware of the application, the information of the target DDL event being information of a most recently generated DDL event in the synchronization middleware;
determine a first DDL event corresponding to the information of the target DDL event;
determine, according to the first DDL event, a timestamp sequence of the first DDL event generated by at least one database sub-library executing the first DDL event in the plurality of database sub-libraries; and
adjust at least one DML statement sequentially according to information of the first DDL event corresponding to the timestamp sequence.

16. The electronic device of claim 15, wherein the processor is configured to:
sort the information of the first DDL event corresponding to the timestamp sequence according to a chronological order of the timestamp sequence; and
adjust the at least one DML statement sequentially based on the sorted information of the first DDL event.

17. A non-transitory computer-readable storage medium, having a computer program stored therein, wherein the computer program is configured to, when executed by a processor, implement a data processing method, comprising:
acquiring and parsing a target transaction change log of each database sub-library among a plurality of database sub-libraries listed in a master table of an application, the target transaction change log being a most recently generated transaction change log in the database sub-library;
in response to determining that an event type indicated by the target transaction change log is a Data Definition Languages (DDL) event, recording information of the DDL event, which has been recorded in the target transaction change log, in a target event slot corresponding to the DDL event, so as to monitor progress information about execution of the DDL event by each database sub-library among the plurality of database sub-libraries listed in the master table of the application; and
in response to determining that all the information of the DDL event with a same table name is recorded in the target event slot, synchronizing all the information of the DDL event in the target event slot to a synchronization middleware of the application corresponding to the DDL event.

18. The non-transitory computer-readable storage medium of claim 17, wherein the target transaction change log comprises the table name of the DDL event, and the information of the DDL event comprises a summary of a change content of the DDL event, a database sub-library identifier of the DDL event, and a timestamp of execution of the DDL event by the database sub-library corresponding to the database sub-library identifier of the DDL event;
the recording information of the DDL event, which has been recorded in the target transaction change log, in a target event slot corresponding to the DDL event comprises:
determining the target event slot corresponding to the table name of the DDL event; and
recording at least one of the summary of the change content of the DDL event, the timestamp, or the database sub-library identifier of the DDL event in the determined target event slot.

* * * * *